United States Patent [19]
Sumner et al.

[11] Patent Number: 5,856,901
[45] Date of Patent: Jan. 5, 1999

[54] DISK DRIVE CARTRIDGE DOOR

[75] Inventors: Wayne A. Sumner, Ogden; Allen T. Bracken, Layton; David W. Griffith, Layton; David E. Jones, Layton; Edward L. Rich, Ogden, all of Utah

[73] Assignee: Iomega Corporation, Roy, Utah

[21] Appl. No.: 66,149

[22] Filed: Apr. 24, 1998

Related U.S. Application Data

[63] Continuation of Ser. No. 834,256, Apr. 15, 1997, Pat. No. 5,768,074, which is a continuation of Ser. No. 550,819, Oct. 31, 1995, Pat. No. 5,671,109, which is a continuation-in-part of Ser. No. 482,010, Jun. 7, 1995, Pat. No. 5,570,252.

[51] Int. Cl.[6] .................................................. G11B 23/03
[52] U.S. Cl. ............................................................ 360/133
[58] Field of Search ................................... 360/133, 132; 369/291

[56] References Cited

U.S. PATENT DOCUMENTS

| | | | |
|---|---|---|---|
| 4,045,821 | 8/1977 | Fujikura | 360/132 |
| 4,400,748 | 8/1983 | Bauck et al. | 360/99.02 |
| 4,864,452 | 9/1989 | Thompson et al. | 360/133 |
| 4,901,173 | 2/1990 | Jones et al. | 360/99.04 |
| 5,216,558 | 6/1993 | Griffith et al. | 360/99.06 |
| 5,381,402 | 1/1995 | Lee et al. | 369/291 |
| 5,481,420 | 1/1996 | Cardona et al. | 360/133 X |
| 5,515,358 | 5/1996 | Goto | 360/133 X |

*Primary Examiner*—John H. Wolff
*Attorney, Agent, or Firm*—Woodcock Washburn Kurtz Mackiewicz & Norris LLP

[57] ABSTRACT

A cartridge for a magnetic disk drive has a rigid shell and a flexible door which covers an opening through which read/write heads engage the recording medium. The flexible door is guided outside of the shell to an open position as the cartridge is inserted into the drive. A projection on a flexible arm in the drive catches a hole in the flexible door to open it as the cartridge is inserted into the drive. The door which opens along the outside of the cartridge conserves space so that the recording medium can be large for a given form factor drive.

15 Claims, 11 Drawing Sheets

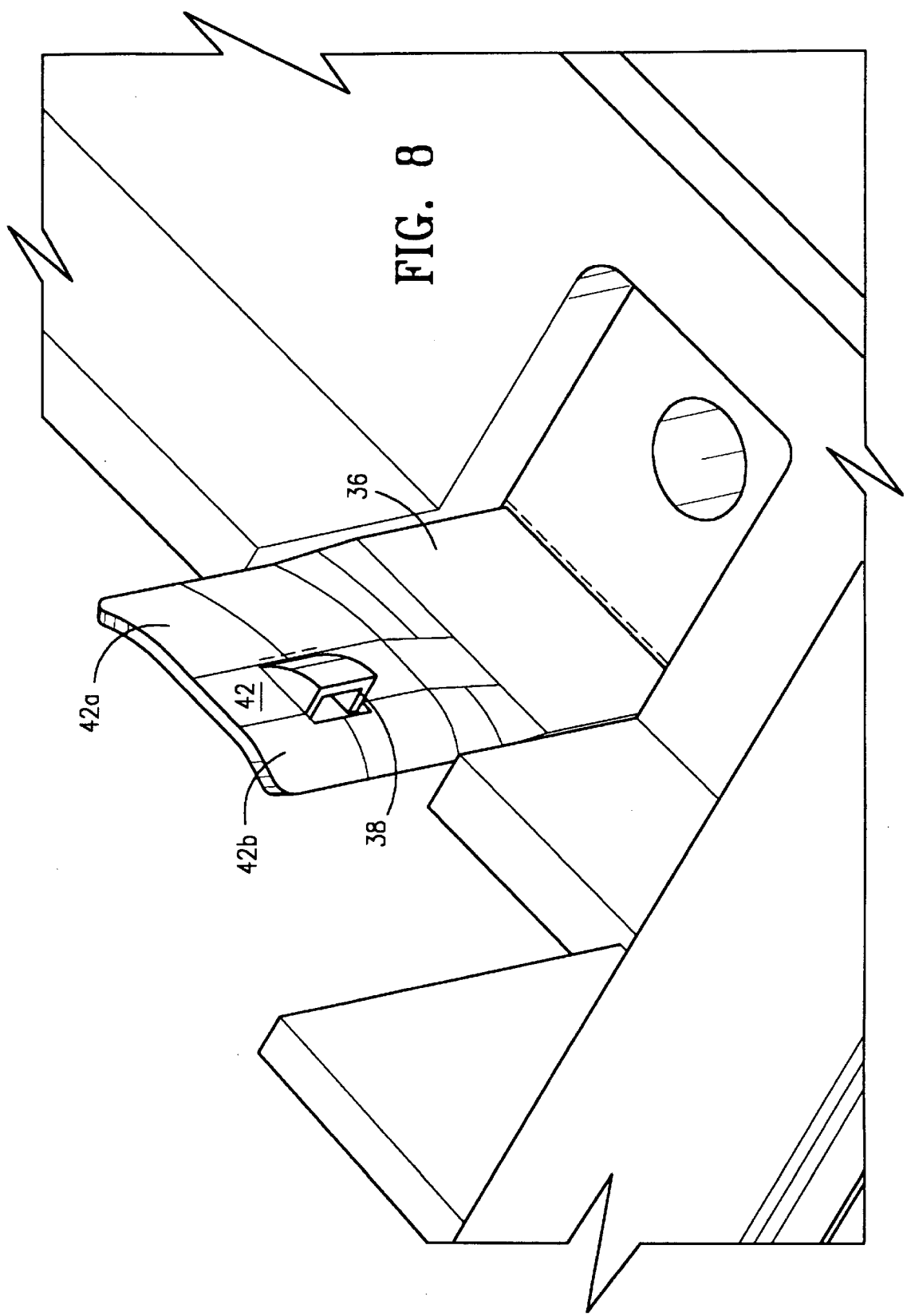

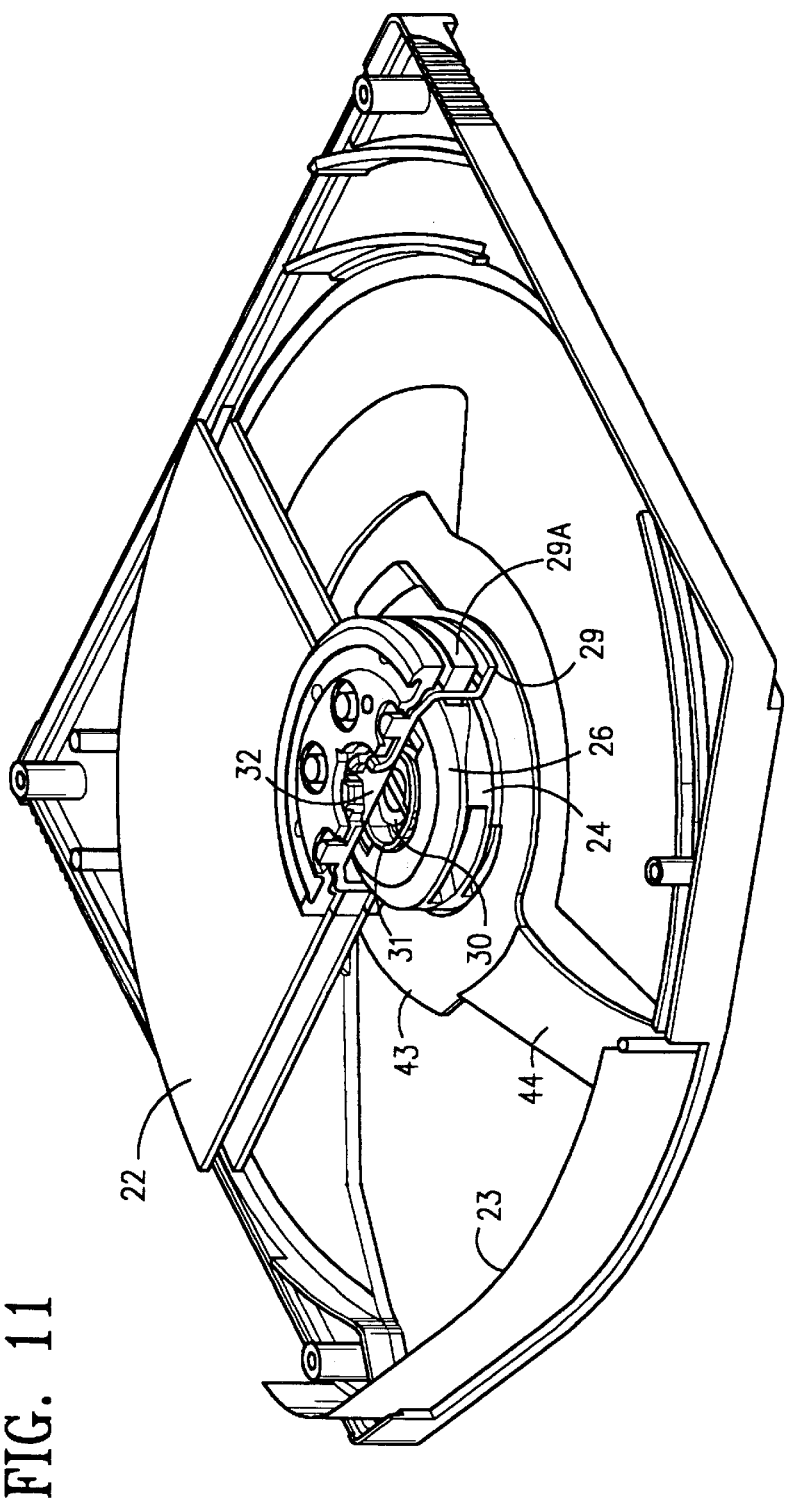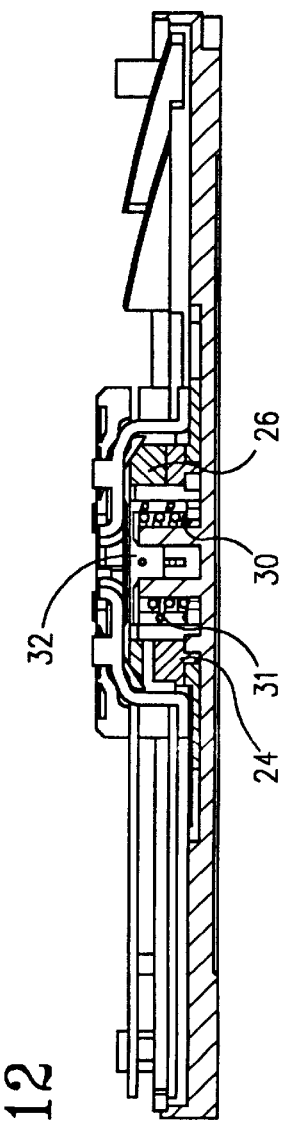
FIG. 11
FIG. 12

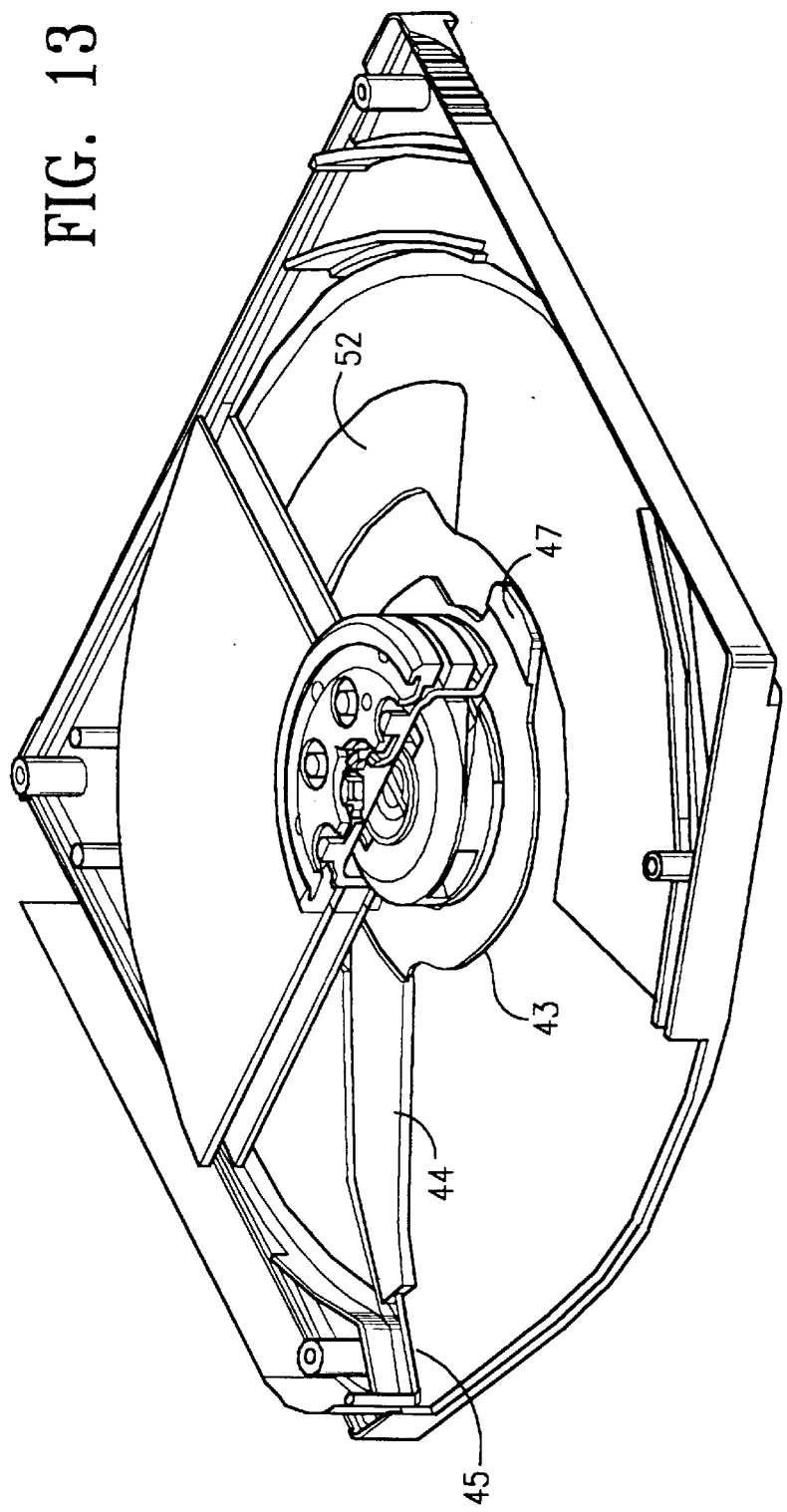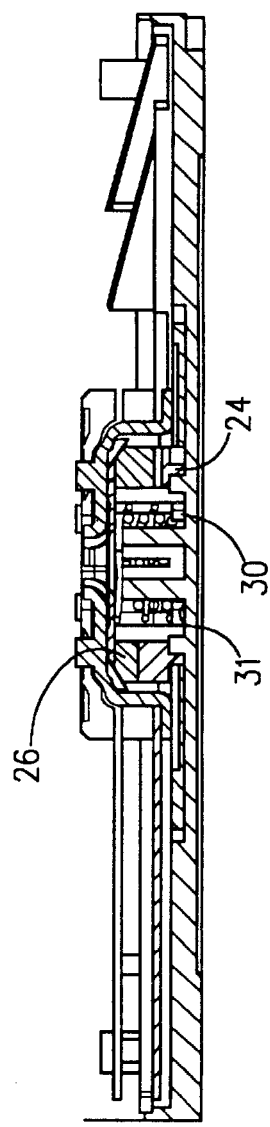
FIG. 13
FIG. 14

DISK DRIVE CARTRIDGE DOOR

RELATED APPLICATIONS

This patent application is a Continuation of Ser. No. 08/834,256 filed Apr. 15, 1997, now U.S. Pat. No. 5,768,074 issued Jun. 16, 1998, which is a Continuation of Ser. No. 08/550,819 filed Oct. 31, 1995, now U.S. Pat. No. 5,671,109 issued Sep. 23, 1997, which is a Continuation-in-Part of Ser. No. 08/482,010, now U.S. Pat. No. 5,570,252 issued Oct. 29, 1996.

BACKGROUND OF THE INVENTION

This invention relates to data storage drives and more particularly, to a removable cartridge for magnetic disk drives.

Magnetic disk drives which write and read digital data from flexible magnetic disks have been extensively used. "Floppy disk drives" have been extensively used for small, so-called microcomputer systems, for word-processing applications and the like. The flexible disk cartridge includes a relatively thin, flexible jacket which is inserted into the floppy disk drive.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive. Rigid disks enclosed in a rigid, removable cartridge, or shell have also been used. U.S. Pat. No. 4,864,452—Thompson, et al is an example of such a drive.

"Bernoulli" disk drives having performance characteristics similar to that of Winchester drives, but with removable cartridges, have been developed. A flexible magnetic disk is enclosed in a rigid box which is normally completely closed. U.S. Pat. No. 4,400,748—Bauck, et al and related patents to the common assignee show such drives using Bernoulli stabilized flexible disks. U.S. Pat. No. 4,901,173—Jones et al and related patents to a common assignee, show improvements which relate to so-called "half height" drives.

The cartridges for these drives have a door which closes the cartridge when it is removed from the drive. This prevents debris from contaminating the magnetic recording medium when the cartridge is not in the drive. When the cartridge is inserted into the drive, this door slides to an open position to provide access for the magnetic recording heads to engage the recording medium.

U.S. Pat. No. 5,216,558—Griffith, et al shows a drive for a rigid cartridge in which the cartridge door slides to an open position inside of the cartridge. In the aforementioned Thompson, et al patent, the door also slides to an open position inside the cartridge. In these drives, and in the cartridges used therein, space is at a premium. The cartridge has a narrow width into which the door must fit. This width is constrained by the relative size of the disk drive form factor. Also, the size of the disk relative to size of the casing severely limits the amount of room which is available inside the cartridge. It is desirable to have the disk occupy as much space within the cartridge as possible. This provides the maximum data storage capacity for a given drive form factor.

It is an object of the present invention to provide a cartridge with a sliding door which optimizes the amount of space available for the recording medium for a given form factor drive.

SUMMARY OF THE INVENTION

In accordance with the present invention, a thin, flexible door slides in narrow parallel tracks in the two halves of the cartridge shell. The door travels in tracks which guide the door outside of the cartridge parallel to the side of the cartridge when it is inserted into the drive. This exposes the disks in the cartridge for access by read/write heads.

A small projection on the end of a flexible arm catches the cartridge door, which is initially in its closed position, and pulls it out and along side the cartridge into the open position as the cartridge is inserted into the drive. The flexible arm insures that the projection will catch the cartridge door no matter where the cartridge is located in the drive opening. Special curved surfaces around the small projection control its penetration into a groove along the cartridge side.

The narrow space constraint into which the door must fit is caused by the relative size of the drive form factor and the disk size in the cartridge. Because the door slides outside of the cartridge, space inside of the cartridge is conserved.

The foregoing and other features, advantages and objects of the invention will be better understood from the following more detailed description and appended claims.

SHORT DESCRIPTION OF THE DRAWINGS

FIG. 8 shows the projection which opens the door;

FIG. 11 is a broken away perspective view of a preferred embodiment of the invention with the door in the closed position;

FIG. 12 is a cross-section of the cartridge of FIG. 11;

FIG. 13 is a broken-away perspective view of the cartridge of the preferred embodiment with the door in the open position;

FIG. 14 is a cross-section of the cartridge of FIG. 13; and

DESCRIPTION OF THE PREFERRED EMBODIMENT

Figure 2:
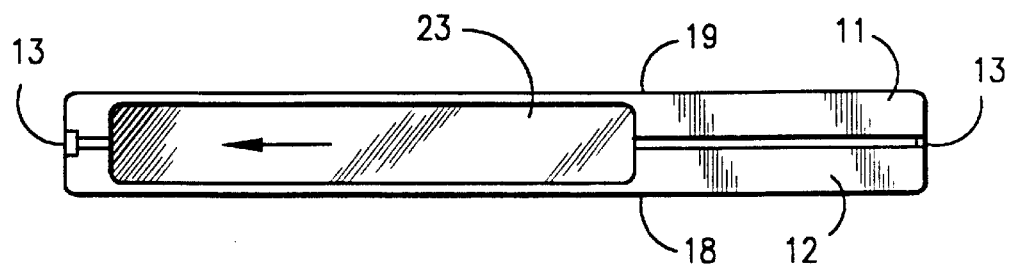
FIG. 2 is a front view of the cartridge.
Figure 1:
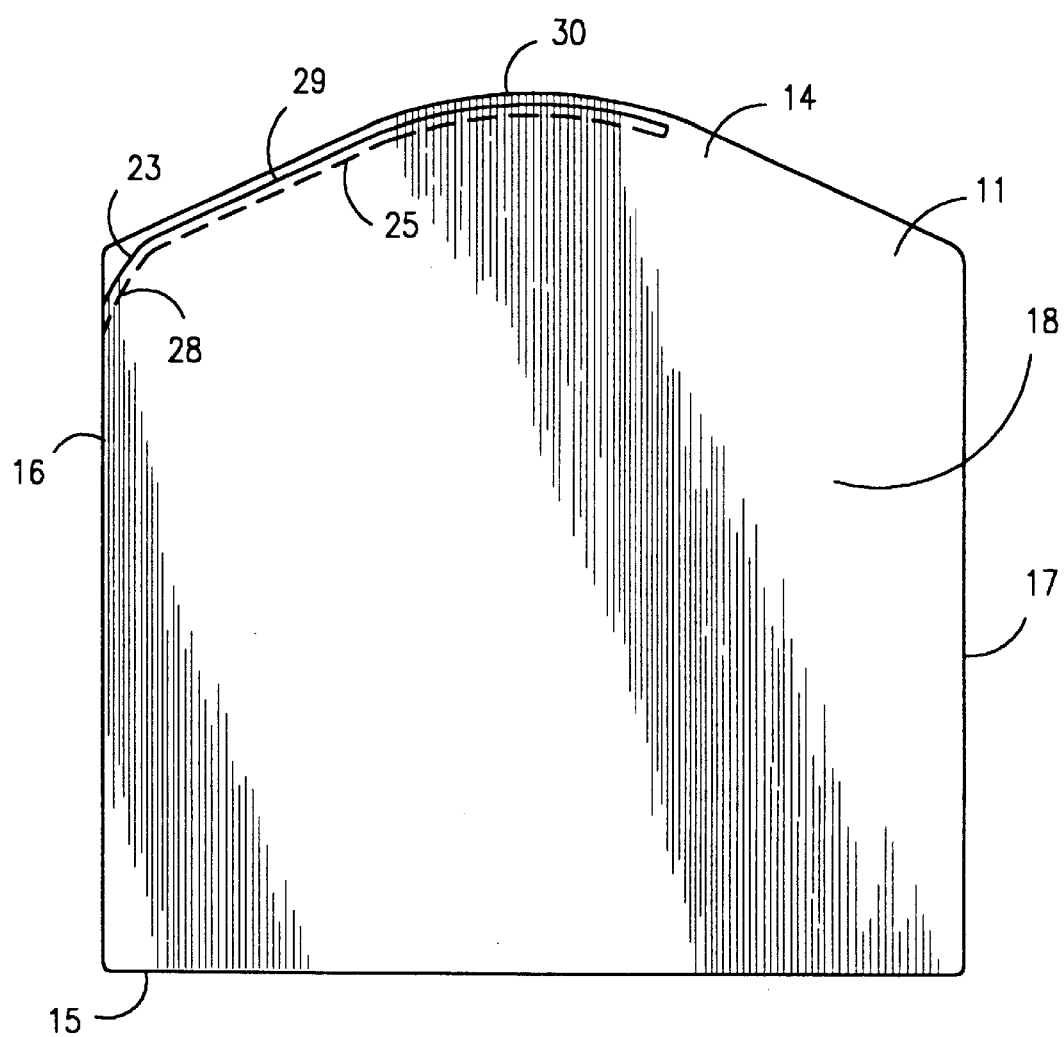
FIG. 1 shows a top view of the cartridge of the present invention.
Figure 3:
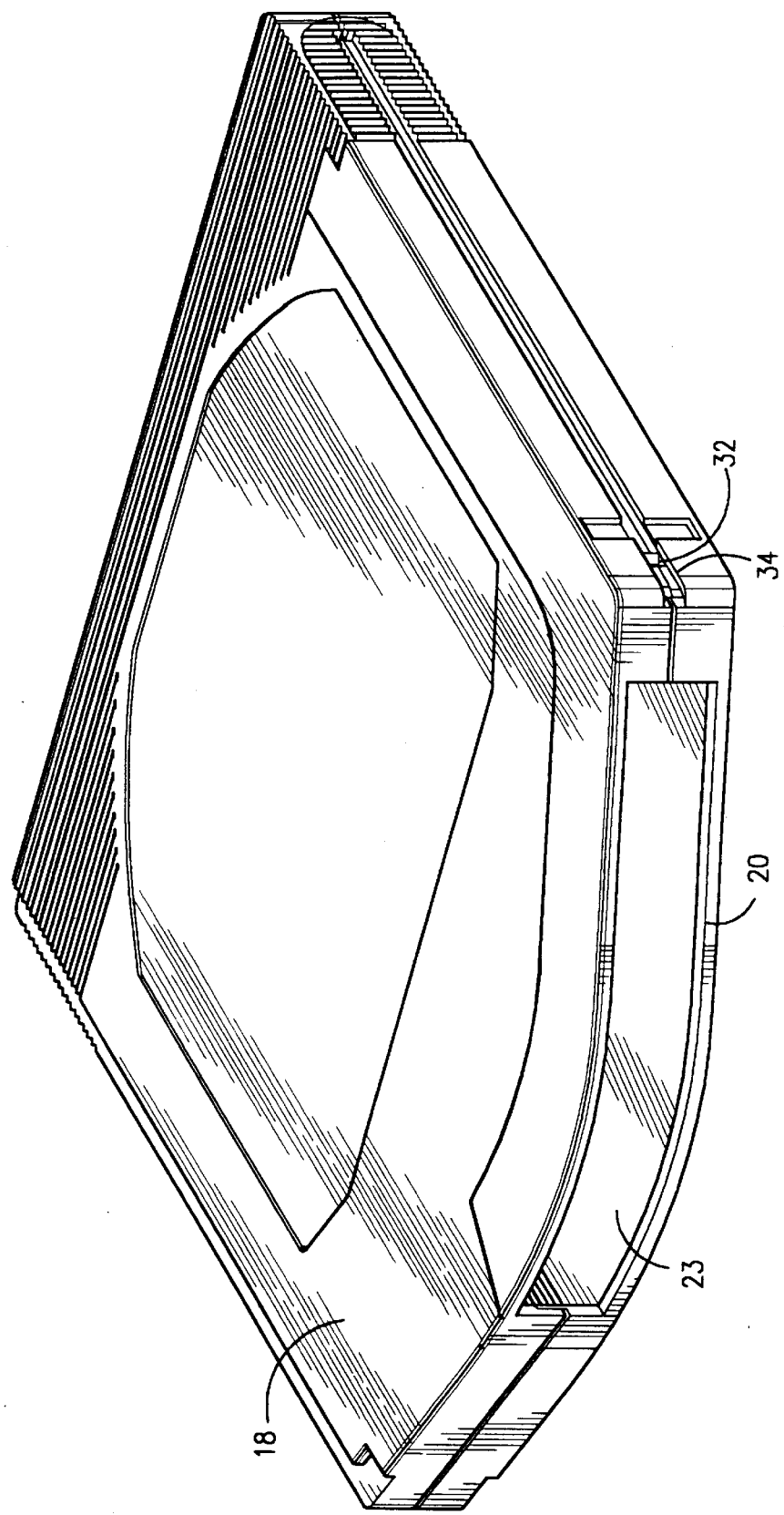
FIG. 3 is an isometric view of the cartridge with the door closed.
Figure 4:
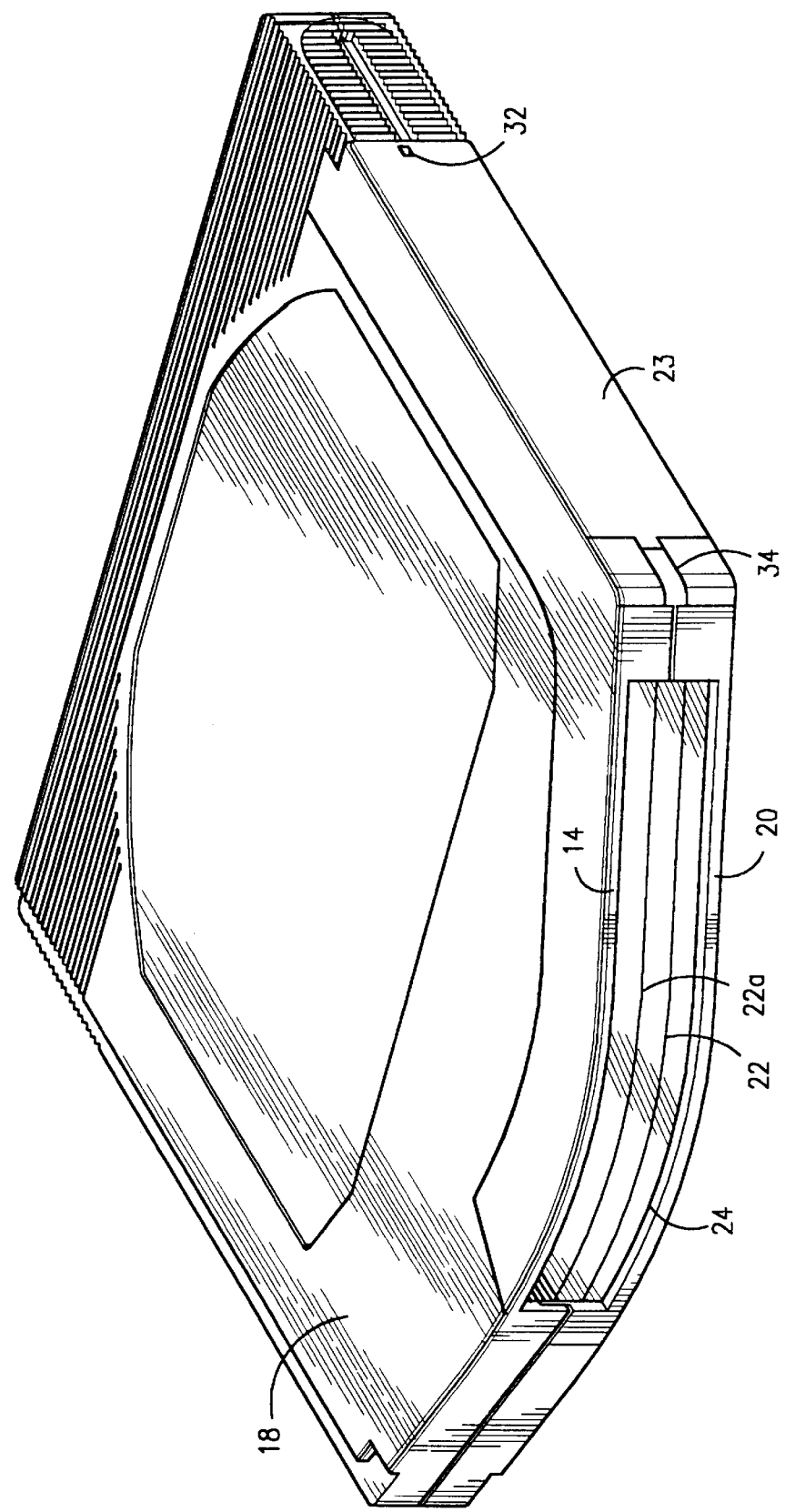
FIG. 4 is an isometric view of the cartridge with the door open.
Figure 5:
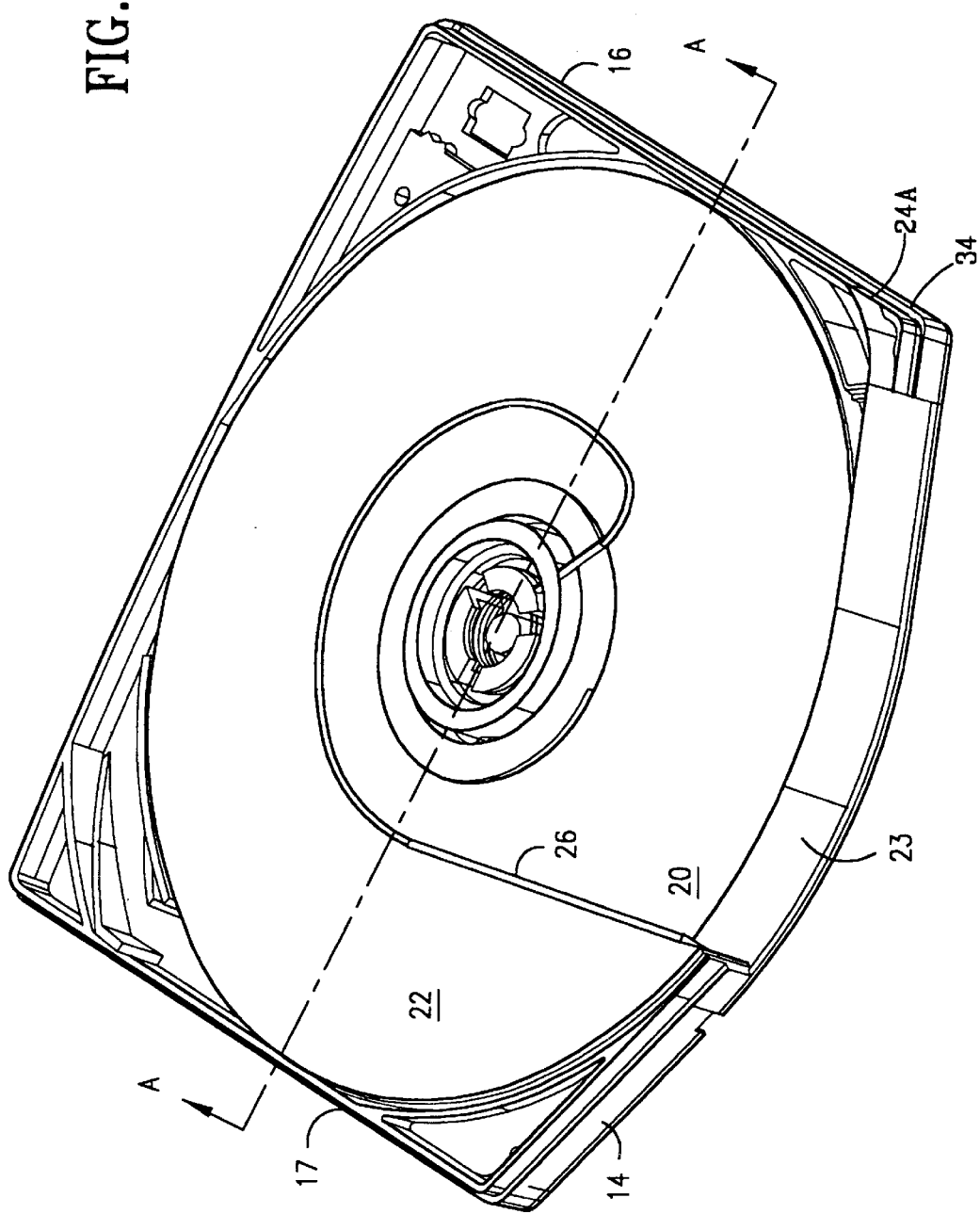
FIG. 5 shows an isometric view of the cartridge with the top shell removed.

FIGS. 1–5 show a cartridge having two half shells, a bottom half shell 11 a top half shell and 12 joined together at 13. The cartridge has a front 14, a back 15 and two sides 16 and 17 between substantially flat, planar surfaces 18 and 19. An opening 20 in the front of the cartridge provides access by the read/write heads 21 (FIG. 7) to the recording disks 22, 22A (FIG. 4). A flexible door 23 covers the opening when the cartridge is removed from the drive.

Track 24 (FIG. 4) and a corresponding track 25 (FIG. 1) in the top half shell, guide the door outside of the shell when the door is opened. The tracks extend along the front 14 and guide the door to a position along one side 16 of the shells when the door is opened. The flexible door 23 slides in the tracks from a closed position, shown in FIG. 3, in which it covers the opening 20, to the open position as shown in FIG. 4. The door 23 slides along the outside of the shell along the side 16 when the cartridge is inserted into the drive. The spring 26 biases the door into the closed position.

The cartridge has a small radius 28 at the corner between the side 16 and the front of the cartridge. A straight section 29 is between the small radius 28 and the large radius 30 at the front of the cartridge. The door is sufficiently flexible to follow the door tracks around the large radius 30, through the straight section 29, and the small radius 28.

The door 23 has a width approximately co-extensive with the width of the shell. The length of door 23 is sufficient to cover the opening 20 in the closed position and short enough to fit along the side 16 of the cartridge when it is in the open position. The length and width of the door are constrained by the form factor of the drive and the size of the recording disks 22 and 22A which occupy most of the interior of the cartridge.

The flexible door 23 has a hole 32 (FIGS. 3 and 4) at the end thereof. A projection 38 on the drive catches the hole 32 when the cartridge is inserted into the drive to pull the door to the open position. A groove 34 in the corner of the cartridge, at the end 24A of track 24, guides the projection to the hole 32.

Figure 6:
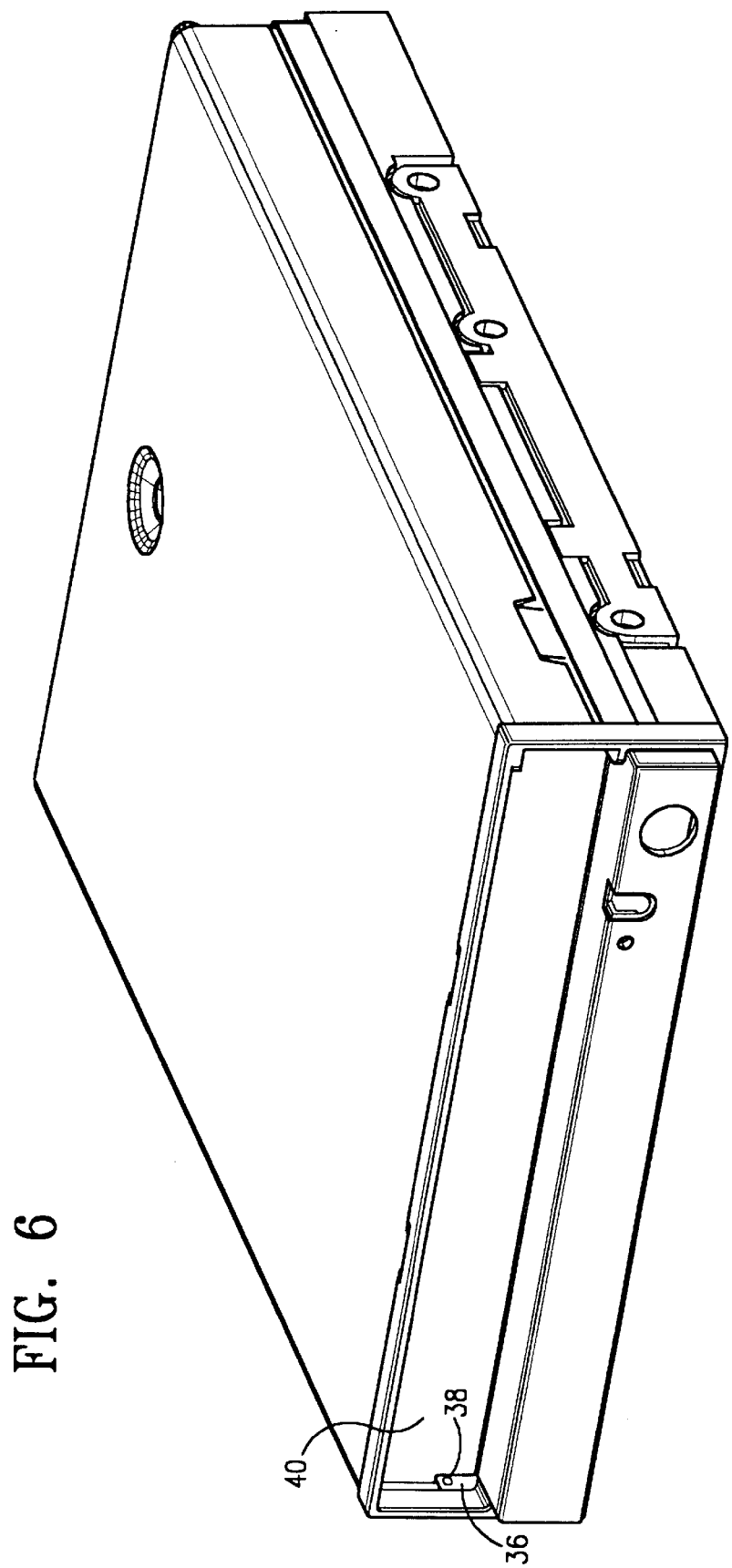
FIG. 6 shows the drive.
Figure 7:
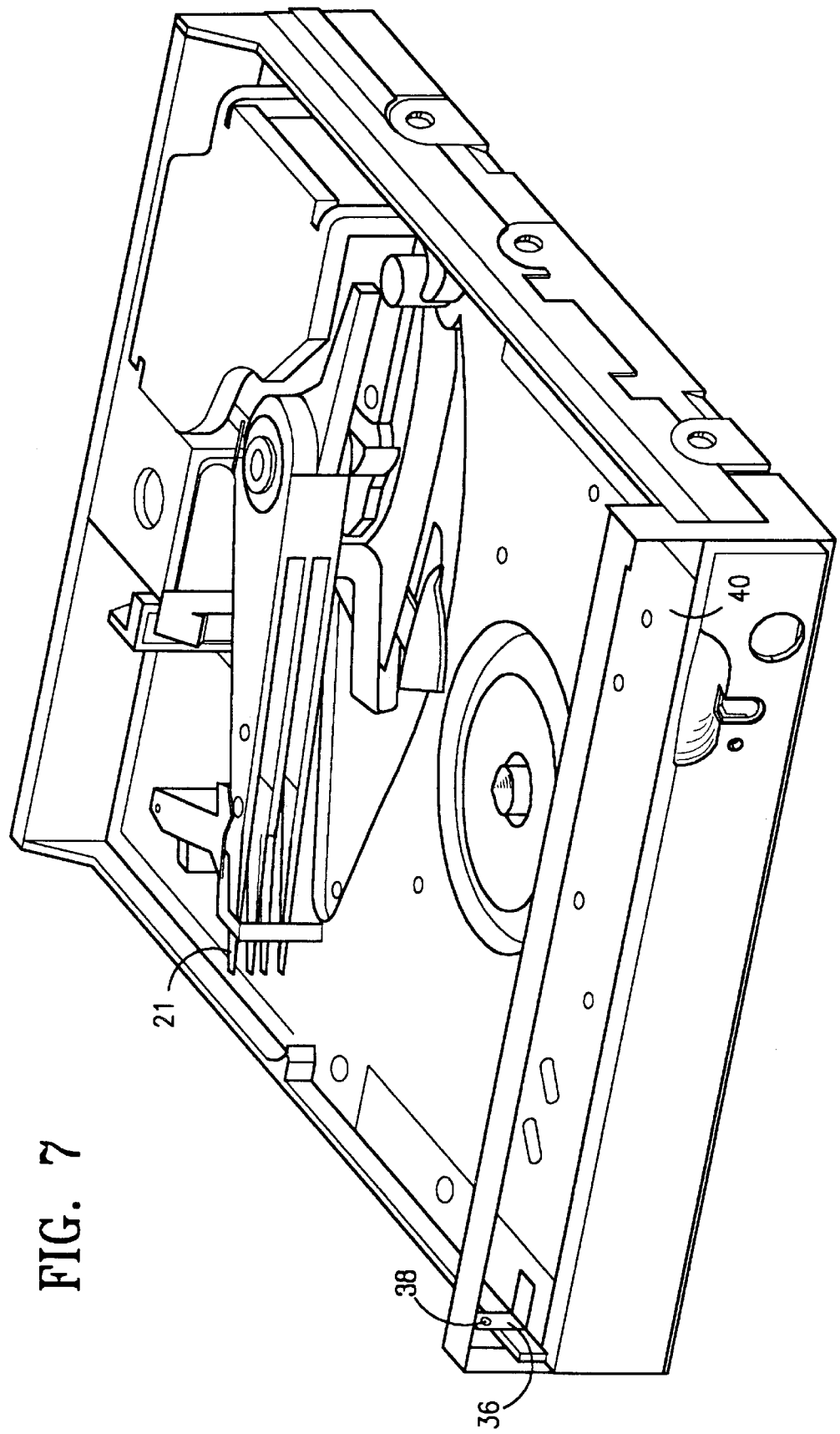
FIG. 7 shows the drive with the cover removed.

FIGS. 6 and 7 show the drive. A projection 38 (FIG. 8) on the flexible L-shaped arm 36 catches the hole 32 when the cartridge is inserted into the drive.

FIG. 8 shows the projection 38 in more detail. Special features include curved surfaces 42a and 42b on both sides of surface 42 from which the projection 38 extends. These surfaces control the penetration of the projection 38 into the groove 34 along the cartridge side. This ensures proper engagement of the projection 38 and hole 32.

FIGS. 9A–C and 10 show, top, front, side and isometric views, respectively, of the flexible arm 36 on which the projection 38 is mounted. The flexibility of arm 36 ensures that the projection 38 will catch the hole 32 in the door no matter where the cartridge is located in the slot 40 in the drive. This variation in cartridge location is caused by normal manufacturing tolerances.

Figure 15:
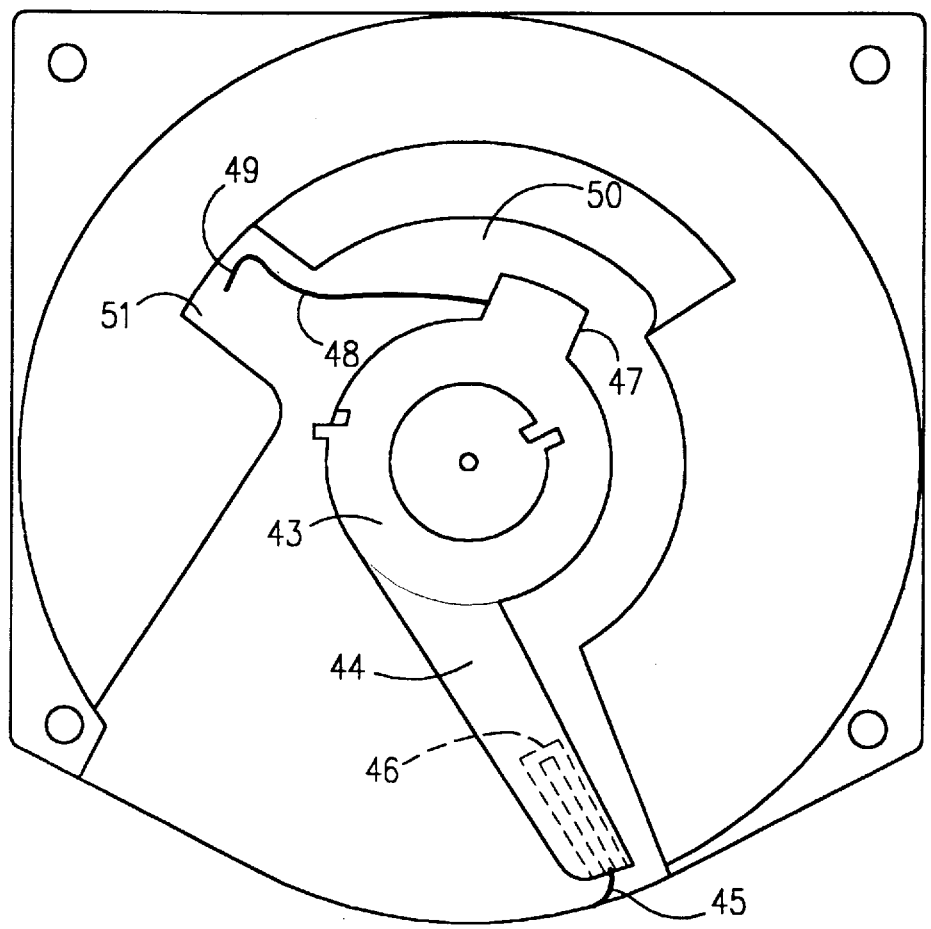
FIG. 15 is a top-plan view of the cartridge with the top shell and disks removed.

FIGS. 11–15 show a preferred embodiment of the invention in which the connection between the clamping mechanism and the door is a member 43 which is rotatable about the axis of the disks. Rotatable member 43 has an arm 44 extending radially toward the door 23. The terminal end of arm 44 is connected to the door by the wire 45. (FIGS. 13 and 15). Wire 45 is disposed in an opening 46 in the arm. The wire telescopes into and out of the opening 46 as the door travels through its stroke. This accommodates the varying radial distance to the door throughout its stroke.

A protrusion 47 on the arm has a spring 48 which provides the closing force needed to close the door through the last portion of its travel. The spring 48 has a bent end 49 which travels in the arcuate path 50. The arcuate path has a notch 51 at the closing end thereof. As the bent end 41 travels along arcuate path 50, it drops into the notch 51 at the closing end of the door stroke. This provides the extra force necessary to close the door.

Arcuate path 50 is a depression in the face of the cartridge. This depression has a cover 52 (FIG. 13) so that the spring 48, and its bent end 49 travel in a closed path.

Other embodiments are within the true spirit and scope of the invention. The appended claims, are therefore, intended to cover all such embodiments.

What is claimed is:

1. A cartridge for a disk drive in which read/write heads are provided for reading and recording information, said cartridge comprising:
    a shell having a front edge, a back edge, and two side edges between substantially flat planar surfaces, the front edge of said shell having a convex portion that protrudes outwardly from the front edge of said shell, said two side edges being substantially planar;
    a rotatable recording medium in said shell upon which information may be written or read;
    a first opening in the convex portion of the front edge of said shell, whereby access to the recording medium is provided to said read/write heads;
    a thin movable door covering said opening in the convex portion of said shell when said door is in a closed position; and
    a catch connected to said door, said catch being engageable by a projection of said drive; and
    a groove in the outside of said cartridge between said front edge of said shell and one side edge of said shell, said groove guiding said projection to said catch, said groove being extended along said one side edge, said catch being moveable along said groove as said cartridge is inserted into the drive, thereby pulling the door to an open position in which said door does not cover said opening in the convex front portion of the front edge of the cartridge.

2. The cartridge recited in claim 1 further comprising:
    a second opening in said one side edge of said cartridge, said catch being exposed through said second opening when said door is in the closed position.

3. The cartridge recited in claim 1 wherein said groove guides said projection to said catch.

4. The cartridge recited in claim 1 wherein the catch, and the door, move outside of the cartridge along said one side edge as the cartridge is inserted into the drive.

5. The cartridge recited in claim 1 wherein said shell is rigid.

6. The cartridge recited in claim 1 wherein the shape of said convex portion of the front edge of said cartridge comprises a small radius curve adjacent the forward end of one of said side edges of the shell, a large radius curve in the middle of said front edge, and a straight section between said small radius curve and said large radius curve.

7. The cartridge recited in claim 1 wherein said shell comprises two portions joined along said front, back and two side edges.

8. The cartridge recited in claim 1 wherein said door has a width approximately co-extensive with the width of said shell.

9. The cartridge recited in claim 1 further comprising:
    a member rotatable about the axis of said recording medium, said member being connected to said door; and
    a spring connected to said member for returning said door to said closed position when said cartridge is removed from said drive.

10. The cartridge recited in claim 9 further comprising:
    a protrusion on said member; and
    an arcuate path for said spring, said spring having a bent end, said bent end traveling in said arcuate path as said door moves from the open to the closed position.

11. The cartridge recited in claim 10 further comprising:
    a notch at the end of said arcuate path, said bent end of said spring traveling into said notch to provide the force to close said door through the last portion of travel of said door to its closed position.

12. The cartridge recited in claim 10 further comprising:

a cover for said arcuate path, said spring traveling in the covered arcuate path as said door moves between the open and the closed position.

13. The cartridge of claim 1, wherein said shell is symmetrical about a plane bisecting said shell at a midpoint between the two side edges, and extending parallel to said side edges and perpendicular to the substantially flat planar surfaces of said shell.

14. A cartridge for a disk drive in which read/write heads are provided for reading and recording information, said cartridge comprising:

a shell having a front edge, a back edge, and two side edges between substantially flat planar surfaces, the front edge of said shell having a convex portion that protrudes outwardly from the side edges of said shell, said two side edges being substantially planar;

a rotatable recording medium in said shell upon which information may be written or read;

an opening in the convex portion of the front edge of said shell, whereby access to the recording medium is provided to said read/write heads;

a thin, movable door covering said opening in the convex portion of said shell when said door is in a closed position; and a catch connected to said door, a second opening in one of said side edges near the junction of said one side edge and said front edge of said shell; said catch being exposed through said second opening in said one side edge of said cartridge when said door is in the closed position, said catch being engageable by a projection of said drive and movable outside of the cartridge along said one side edge as the cartridge is inserted into the drive, thereby pulling the door to an open position in which said door does not cover said opening in the convex portion of the front edge of said shell.

15. A cartridge for use in a disk drive, the disk drive including read/write heads for reading and recording information, the disk drive defining an opening permitting the cartridge to be inserted into the disk drive, the cartridge comprising:

a shell having a front edge, a back edge, and two side edges, the front edge of said shell having a convex portion that protrudes outwardly from the side edges of said shell, said two side edges being substantially planar, the front edge defining a first opening in said convex portion, one of said side edges defining a second opening proximal a junction of said one side edge and said front edge;

a rotatable recording medium in said shell upon which information may be written or read;

a door movable between an open position and a closed position, the door covering said opening in the convex portion of said shell when the door is in said closed position, the door not covering at least a portion of said opening in the convex portion of said shell when the door is in said open position and thereby permitting said read/write head to access the recording medium when the door is in said open position and when the cartridge is inserted into the disk drive;

a catch connected to said door, at least a portion of said catch being exposed through said second opening in said one side edge of said cartridge, said catch being movable relative to said shell outside of the cartridge between a first position and a second position, said door being in said closed position when said catch is in said first position, said door being in said open position when said catch is in said second position, a projection of the drive engaging said catch when the cartridge is inserted into the drive and moving said catch from said first position to said second post as the cartridge is inserted into the drive.

\* \* \* \* \*

UNITED STATES PATENT AND TRADEMARK OFFICE
CERTIFICATE OF CORRECTION

Figure 9A:
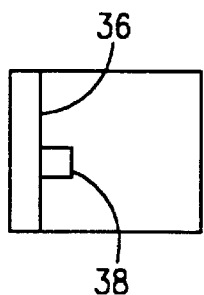
FIGS. 9A–9C are top, front and right side view of the projection.
Figure 9B:
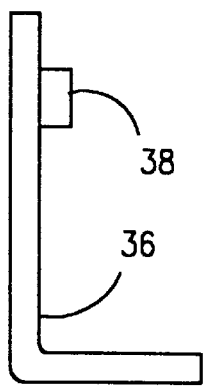
Figure 9C:
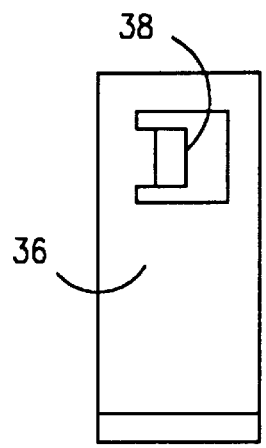

PATENT NO. : 5,856,901
DATED : January 5, 1999
INVENTOR(S) : Wayne A. Sumner et al It is certified that error appears in the above-identified patent and that said Letters Patent is hereby corrected as shown below:

Col. 2, line 40, change "FIGS. 9A-9C are top, front and right side of the projection" to --FIGS. 9A-9C are top, front and right side views of another embodiment of the projection.--(PTO).

Figure 10:
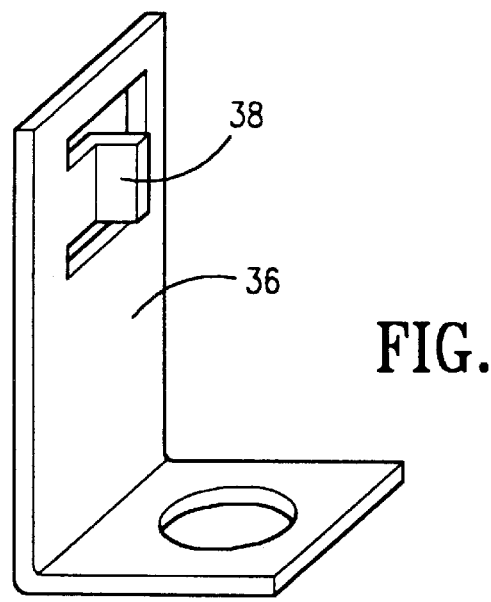
FIG. 10 is an isometric view of another embodiment of the projection of FIGS. 9A–9C.

Col. 2, line 42, change "FIG. 10 is an isometric view of another embodiment of the projection of FIGS. 9A-9C" to --FIG. 10 is an isometric view of the projection of Figs. 9A-9C.--(PTO)

Col. 3, line 24, after "cartridge" insert --at the end 24A of track 24,--(PTO)

Col. 3, line 26, after "cartridge" delete "at the end 24A of track 24".(PTO)

Signed and Sealed this

Twenty-fifth Day of May, 1999

Attest:

Q. TODD DICKINSON

*Attesting Officer*    *Acting Commissioner of Patents and Trademarks*